United States Patent
Gagnon et al.

(10) Patent No.: US 8,489,880 B1
(45) Date of Patent: Jul. 16, 2013

(54) REMOTE EXECUTION OF COMMANDS TRANSMITTED THROUGH AN OPEN NETWORK WITH DECOUPLED FEEDBACK

(75) Inventors: Jean Gagnon, Ontario (CA); Paul J. Lagassey, Vero Beach, FL (US)

(73) Assignee: Cousins Intellectual Properties, LLC, Vero Beach, FL (US)

( * ) Notice: Subject to any disclaimer, the term of this patent is extended or adjusted under 35 U.S.C. 154(b) by 931 days.

(21) Appl. No.: 11/840,997

(22) Filed: Aug. 20, 2007

Related U.S. Application Data

(60) Provisional application No. 60/825,034, filed on Sep. 8, 2006, provisional application No. 60/829,523, filed on Oct. 13, 2006.

(51) Int. Cl.
*H04L 9/32* (2006.01)

(52) U.S. Cl.
USPC ........................................................ 713/176

(58) Field of Classification Search
USPC ........................................................ 713/176
See application file for complete search history.

(56) References Cited

U.S. PATENT DOCUMENTS

| | | | | |
|---|---|---|---|---|
| 4,283,710 | A * | 8/1981 | Genest et al. | 235/382.5 |
| 6,609,196 | B1 * | 8/2003 | Dickinson et al. | 713/154 |
| 6,836,846 | B1 * | 12/2004 | Kanevsky et al. | 713/193 |
| 7,196,807 | B2 * | 3/2007 | Goldstone | 358/1.15 |
| 7,395,311 | B2 * | 7/2008 | Kaler et al. | 709/203 |
| 2002/0087619 | A1 * | 7/2002 | Tripathi | 709/202 |
| 2002/0186419 | A1 * | 12/2002 | Tanimoto | 358/402 |
| 2003/0135740 | A1 * | 7/2003 | Talmor et al. | 713/186 |
| 2006/0005033 | A1 * | 1/2006 | Wood | 713/182 |
| 2006/0235800 | A1 * | 10/2006 | Furlong et al. | 705/59 |
| 2007/0160015 | A1 * | 7/2007 | Andriantsiferana | 370/338 |

* cited by examiner

*Primary Examiner* — William S. Powers
*Assistant Examiner* — Dant Shaifer Harriman
(74) *Attorney, Agent, or Firm* — Steven M. Hoffberg; Ostrolenk Faber LLP

(57) ABSTRACT

A command processor providing user authentication and message tamper detection, comprising: an interface to read email; and a processor for (i) analyzing command processor messages to determine an authentication of a sender; (ii) analyzing command processor messages to determine if the command message has been altered from an authentic message content; and if the command processor message is from an authenticated sender and unaltered, passing the message to a command processor.

59 Claims, 1 Drawing Sheet

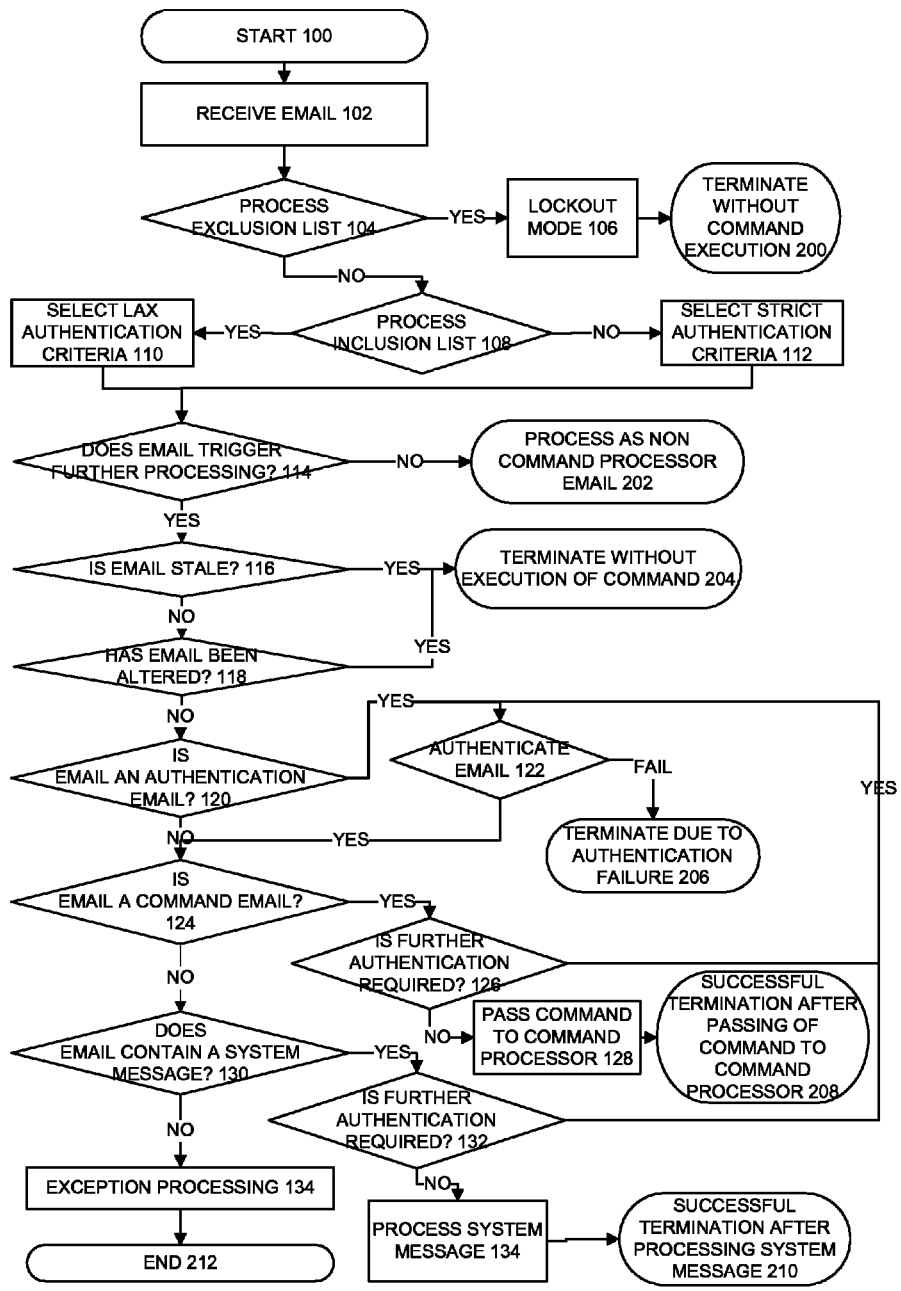

REMOTE EXECUTION OF COMMANDS TRANSMITTED THROUGH AN OPEN NETWORK WITH DECOUPLED FEEDBACK

RELATED APPLICATIONS

The present application claims benefit of priority from U.S. Provisional Patent Application No. 60/829,523, filed Oct. 13, 2006, and U.S. Provisional Patent Application No. 60/825,034, filed Sep. 8, 2006, each of which is expressly incorporated herein in its entirety.

TECHNICAL FIELD

The present invention relates to computer software. More particularly, the invention is directed to a system and method for communicating commands for execution at a remote location through a network with no direct feedback path between the source and destination.

BACKGROUND OF THE INVENTION

Remote execution of commands is well known, for example in spacecraft, virtual desktop user interfaces, client-server applications, and the like. In general, a useful remote command execution system over an open network, such as Internet email, requires user authentication, and typically some form of feedback to confirm status. Further, a sequence of commands often requires conveyance of the state between commends, and a subsequent command may depend on the results of an earlier command.

In many networks, a bidirectional communication protocol is implemented, such that secure communications can be negotiated, for example using PKI techniques, to assure that the communications are not intercepted, and thus expose the system to unauthorized access. Therefore, a simple user-name-password combination passed in cleartext format is insecure, and exposes the execution system to security risks. On the other hand, without execution of a complex algorithm, which cannot be assured on a generic remote client, it is difficult to provide a dynamic password, such that an eavesdropper could not capture the password and resend the message in modified form to take control of the target system.

SUMMARY OF THE INVENTION

The present invention therefore provides a system which is usable over a decoupled feedback communication protocol, to allow secure and authenticated remote execution of commands. Accordingly, the system operates by using a feedback loop over decoupled communications paths, such as POP, IMAP and/or SMTP for email for communications between remote client and host, while providing security.

The user sends a first message in cleartext, indicating a desire to open a command channel to the server. This initial communication generally includes an identification of the user either by username and/or password, but a password is generally unnecessary since it is presumed that the security of communications is compromised. The target then responds with a status message and a public key component. The user receives the communication, and then multiplies the public key component by his password, and then adds a second password (together forming the user's private key), to ensure that an eavesdropper in possession of the public key component cannot simply divide the resulting code by the public key component to determine the user's password. While this process does require some calculation, even simple email client host machines often have a calculator function accessible, to perform this processing. The user then responds with a message containing the desired command or series of commands, and the private key or a predetermined portion of the private key for authentication (for example the first eight, last eight, middle eight or first and last four digits of the private key).

Of course, a complete El Gamal, Diffie Hellman, or Rivest-Shamir-Adleman algorithm may be implemented; however, this is likely too complex to implement without an automated process. Likewise, in some cases, a lower level of security may be imposed, presuming that an interloper does not have access to both incoming and outgoing communications streams, thus negating the need for a high level of security. Finally, in some cases, a shared secret or series of secrets, e.g., a one time pad, may be used, wherein the remote user holds a series of passwords for sequential use.

The process for conveying a command (where a static user key is employed) therefore requires a minimum of three communications; an initiation from user to host, a response from host to user, and an authenticated command from user to host. After authentication, commands may be issued serially, except perhaps where a response is necessary for a subsequent command, in which case a pair of communications will be required.

Different levels of authentication may be required for execution of commands having different security implications. For example, a "retrieve time and temperature" command might have a lower security than a command to reformat the hard drive. Likewise, for some "safe" commands, public access may be intentionally granted, such as to return a picture or other file from a public archive.

The present invention therefore provides a system and method for performing a reasonably secure authentication and/or verification (bearing in mind other security risks inherent in the system) to provide a remote command execution capability with reasonable assurance that such capability will not be available to unauthorized entities. The preferred embodiment employs a loose, asynchronous feedback path for any necessary communications between the target of the commands and the sender of the commands, and permits use without requiring custom software at the sender terminal.

One non-algorithmic method for generating authentication information is to use a one-time pad, which provides a list (for example printed on a card) of "passwords" which are each used only once, and thus the recording of the code does not allow its reuse. One time pad systems of this type have a number of shortcomings, which may be overcome in known manner(s). For example, a card may be stolen. One way to avoid insecurity resulting from this event is to require secret information for use of the card; for example, the characters printed on the card are selected based on a secret which is not printed on the card. A man-in-the-middle attack, for example by interception of a command with a proper code may be avoided by linking the content of the message to the code, so that the message cannot reasonably be changed in transit. For example, the number of words, spaces or characters in the command may be arithmetically added to the code, so that this characteristic cannot be changed. Other characteristics may be alternately or additionally encoded, such as every fourth letter of the command being converted to a digit and added to the code.

Preferably, the target system for command execution may be segregated from an email server or client, but may also provide other email filtering and/or processing functions.

According to a preferred implementation, either a "one-time pad" code scheme (i.e., a non-reusable essentially random key which is prenegotiated between sender and recipient) is employed, or a challenge-response based on secret information is employed, wherein in neither case does one communication substantially risk disclosure of the secret. In order to avoid "man in the middle" attacks, an authentic command or response may be encoded to guard against change. The technique thus assures that communications are authorized and that the authorized commands are not altered in transit. Preferably, all mathematical manipulation required by the algorithm is performable on a simple 4-function (+, -, x, /) calculator.

The host may also employ other means for protecting the system from undesirable commands. For example, delivery of email is sometimes delayed, and processing a command that was issued a week ago could produce undesirable or disasterous results. So the host can be programmed to ignore commands that were sent prior to a predetermined time range, or implement filters of various other types.

Other methods not requiring communication with the host can be used to authenticate commands. For example, a command can be issued in a single communication by performing a mathematical manipulation of the password by the time of day and sending only a predetermined portion of the result.

Another method of accomplishing this is to use a predetermined portion of a webpage that is publicly available. The target webpage and portion are known only to the host and user, and preferably a dynamic page which changes regularly is used. For example, www.nytimes.com refreshes approximately every ten minutes. When a command is sent, the email contains the required portion of text which is readily available to both the user and host. To further enhance security, the desired portion of text can be mathematically manipulated by a password or the time of day, and only a predetermined portion of the result sent in the email with the command. When using this method, preferably, the string of text contains only numerical values, although alphabetic values can be converted to numeric values, for example A=1, B=2, . . . Z=26, which also masks the string of text, further enhancing security. If the time of day is used, the time when the calculation is made, and the time when the host receives it will differ, so the host can be set to accept commands that were issued in a predetermined time-range. Using the time of day also solves the problem of preventing stale commands from being processed, for example if an email containing a command is delayed and subsequently delivered several days later. To further enhance the security of this method, the host can have its own webpage and change the content at predetermined intervals. In this case, the content can be text or a graphic displaying an authentication code which is then mathematically manipulated by the user and included in the message as described above. Alternatively, the host can generate a webpage, or send an email message, when a request for authentication is made, presenting columns and rows of passwords. The passwords are generated randomly, and change regularly. When employing this method, only the user and host know which column and row contains the correct password, and these may change regularly. In another variation, the host can also communicate a first key, which when mathematically manipulated by the user with a second key known only to the host and user, enables the user to determine which row and column contains the valid password. In this variation, the row and column, as well as the password can change dynamically at specified intervals, when requested by the user in a request for authentication, or each time a command is process, thereby preventing the use of a password a second time if it is intercepted. To further enhance security in a webpage embodiment, access to the webpage can be protected by a user name and password.

Another method of single communication authentication is to use serial passwords, or to vary the value used to mathematically manipulate the password by a serial series of numbers. For example, if the first password is 1234 and the second password is 5678, the second password can be increased by 10 each time until it reaches 6678, and then returns to 5687. The value by which to increment and the ending value are known only to the host and user. This method can also be used with others embodiments so that a single challenge from the host can be used multiple times, and the host does not need to send another challenge until the second (serial) password reaches the end of its series. It may also be desirable for the host to save commands in a queue, and send a challenge message only when requested by the user, or when the number of commands in the queue reaches a predetermined number.

When using single communication processing of commands, it may be desirable, although not necessary, for the host to send a reply indicating to the user that the command was received, and/or processed.

Further, it may be desirable to have different levels of authentication for different types of commands. For example, commands which cannot cause a security breach of the host computer may be authenticated by single communication/simple password, and other commands by challenge/response. There may be multiple levels of commands each requiring varying levels of authentication. For example, a command to turn on the kitchen lights may require only a simple password, whereas a command to start a program may require a higher authentication/verification level, and a command to open the garage door still a higher level.

As with identifying the sender of a communication, an inclusion list of commands to allow, or an exclusion list of commands to disallow, may be employed. An inclusion list is preferable, as this prevents any commands not in the list from being executed, thereby protecting the system from processing malicious commands (such as running a virus or erasing files) if the security of the system is compromised.

An alternate method for transmitting the password is available where the processor has access to a secure FTP or HTTP site. When starting, and after processing a command or series of commands, the processor creates a file containing a password to be used for the next command. The user can access this file remotely using a secure protocol and thereafter use this password when sending a command or series of commands. When the command or series of commands is received by the processor, if the password is authentic, the command(s) are processed and the processor creates a new file with a new password to be used for the next command. This prevents a password from being used more than once, limiting security risks if the message is intercepted in transit.

In order to determine whether a command is altered, a checksum or hash (e.g., MD5 cryptographic message digest) may be employed. In order to facilitate manual computation, a relatively simple transformation based on a shared secret (e.g., password) is employed, for example, to convert the command to a numeric string by simple substitution, truncate certain digits, multiply by the password or a portion thereof, and truncate certain digits, which is then presented as a code to authenticate the command itself. This process makes it difficult to determine from the resulting value what the password is, and changes in the command will likely be detected by a difference in the value supplied by the user and the value computed by the remote system.

BRIEF DESCRIPTION OF THE SEVERAL VIEWS OF THE DRAWING

The present invention is described in detail below with reference to the attached FIGURE in the drawing, wherein:

The FIGURE shows a flow chart diagram of a preferred embodiment of the invention.

DESCRIPTION OF THE INVENTION

The preferred system uses the POP3 (or other email) protocol and periodically "scans" emails that are waiting on an email server. When a new email is seen on the server, it is parsed and analyzed.

At the commencement of the process 100, the email is parsed 102, and is filtered initially either based an exclusion 104 or inclusion 108 list, for example from known bad addresses or not from a known good address or otherwise to provide a "lockout" function 106 in case the system detects an attack or is otherwise at risk or compromise. If the email is associated with the inclusion list 108, then it may be afforded a lax authentication criteria 110. If it is from a non-included and non-excluded address, it is typically subject to strict authentication criteria 112. When the system enters a lockout mode 106, the process terminates without command execution 200.

The email is then analyzed 114 to determine whether it contains a system message, or whether it is an email intended for human review 202. The email may then be analyzed 116 for evidence of significant delay, an indication that the proposed command is old or stale, and should not be processed or executed 204. The content of the email is then optionally analyzed 118 to determine whether it has been altered in transit, for example using a hash or digital signature. If altered, it should not be processed or executed 204. The email is then analyzed to determine whether it is a request for authentication 120, a command 124, or other type of message 130. If it is none of these, an optional exception processing routine 134 may occur.

In the case of a request for authorization 122, the system produces a response to a predetermined email address or an address indicated in the communication. In the case of a command, the authorization information and digital signature information are analyzed to ensure that the email is sent from an authorized source. If desired, the email can also be analyzed to ensure that the message was not altered in transit. A command that passes these tests may then be executed directly, or further processed according a set of rules. If it fails authentication, and authentication is required, then the process fails and terminates 206.

An example of a non-command, non-authentication system communication is a public access document response server, which responds to an unauthenticated request for a document from a public archive with an email response attaching the document.

There are two basic types of authentication schemes, a predetermined "secret", such as a password, rolling code, or one-time pad data, and a cryptographic challenge-response system in which a shared secret is negotiated between the parties is used, but not disclosed, during the communication. Of these, a password is least secure (such as might be used in an unencrypted file transfer protocol (ftp) login), since an interception of the communication reveals the secret, and permits an eavesdropper to circumvent the authorization process. A rolling code scheme is more secure, since the same code is not used (or usable) successively. A one time pad is still more secure, since it is not possible to derive the algorithm for generating the rolling code, and the secret is not successively exploited. It is noted that some email communications systems allow secure socket layer (SSL) communications protocol communications. SSL ensures that the communications are not intercepted or modified in transit authentic, but do not generally authenticate the sender. Use of a password would generally be acceptable if communicated using an SSL protocol, since it is not subject to eavesdropping. In many cases, a user does not have control over the communication protocol. Likewise, in some cases, a secure browser is unavailable for interaction using hypertext transport protocol for interactive control over a remote command execution system. In still other cases, the commands themselves involve the email system processor, and therefore access to that system is necessary, through its intrinsic email processing capabilities, or through another communications channel.

In a challenge-response system, the secret information itself is not communicated, but rather a processed version that is authenticated based on corresponding processing by the recipient of the received information. This technique can be used with a password (static secret), rolling code, or one time pad. In a challenge response technique, typically a random number or a processed value is generated, and passed to the counterparty, where it is then processed according to a predetermined algorithm and a secret and returned. Authentication is based on a correspondence of the processed returned value with the expected response. The challenge itself varies each time presented, and the response is valid only for that corresponding challenge, and is subsequently invalid, replay attacks are thwarted. In a rolling code variant, even if the same challenge is repeated, the required result changes.

Using one or more of the aforementioned techniques, or others known in the art, authentication of the user is possible, using a single communication (user to server) or possibly three communications in succession (user to server, server to user, user to server).

In order to secure the command to be passed from modification (alteration, step 118) in transit, a digital signature or hash is provided. While this is readily available in an automated environment, when a manual process (minimally machine assisted) is required, this technique presents substantial opportunity for mistake, or inability to complete the process. Even if possible to complete, the technique is typically quite complex, making its use cumbersome. According to the present invention, the command line to be verified may be entered as an argument on a calculator, for example 8 characters at a time, using telephone keypad or 1-of-26 mapping of characters. The user's password, or selected portions thereof, may be inserted into the process, for example parsed as a ninth digit in each set.

In general, it is desired to perform a simple calculation on a numeric string representing all or a portion of the password. For example, a multiply followed by an add function, truncating high digits, will result in a relatively secure communication, though based on cryptographic theory, not fully secure. For example, through monitoring a series of communications, the secret basis for the algorithm will leak. On the other hand, since this requires that an interloper intercept all of the communications and algorithmically decipher them, the problem is hard, perhaps harder than other alternates for achieving the same harm to the user. In fact, the security of the access authentication may be established at any desired level, up to and including formal hard cryptographic techniques.

After analysis to determine whether the email is an authentication email 120, it is analyzed to determine whether it is a command email 124. If a command email, it may require further authentication 126, in which case further authentication processes 122 are conducted. Otherwise, the command is parsed and passed to the command processor 128, and the process terminates 208 (unless the message is a multi-part or complex message, in which case other analysis and processing may continue).

In some cases, the message is not a command per se, but rather a system message 130, for example to log out of the system, or otherwise control a part of the system distinct from the command processor. In this case, it may require further authentication 126, in which case further authentication processes 122 are conducted. Otherwise, the system message is parsed and processed 134, and the process terminates 210 (unless the message is a multi-part or complex message, in which case other analysis and processing may continue).

The target command parser processor engine may run as a "service" (or a "deamon") under MS Windows or any other operating system that supports internet communications, instead of as an application. Thus, the preferred implementation may run as a program or service under an operating system, interacting with the user through an API, which may be a graphic user interface, command line, task bar, or a remote communication interface, such as email, FTP, TCP/IP, SNMP, etc.

The target command parser processor may also be provided in the form of an appliance, similar to a router, which simply plugs into a network which intercommunicates with the email server. Such appliances typically run Linux, VM Works, or other embedded operating system, and may be combined with various network functions, such as firewall, router, wireless network access, network attached storage, FTP, email server, VPN, telephony, Radius server, etc. The device may employ a web server or voice interface for providing a user interface, and for other purposes. The system may operate without local storage, using another machine on the network, or the email server itself, as the memory. (It is noted that the authentication problem is quite different if a web server is used as a bidirectional user interface, since essentially real-time interactive communications are possible, and secure communications protocols, e.g., SSL, are available to thwart eavesdroppers).

As discussed above, device may include a voice interface, which may provide an opportunity for user authentication. For example, using a channel distinct from the email communication over the Internet, the user may communicate with a voice-enabled application to communicate a password, which is then used to authenticate the email command. While the command itself might also be passed over the voice channel, this itself poses security risks. Therefore, an element of security of this aspect of the invention is the use of distinct channels to authenticate and communicate commands. The voice communication may be authenticated by using biometric aspects (speaker recognition), spoken or DTMF-communicated password, ANI/DSIS (called-ID) or the like.

For example, a user could call in, be authenticated by the, and receive, via spoken voice, a message indicating that the user has a number of commands pending in the queue. The system then reads the commands, permitting the user to provide voice confirmation. Optionally, if the user confirms, he or she could be asked for a password or phrase, which is secret, to [provide user authentication.

An example command string is as follows:

[SM:###:@@@], where: ### is a private security password that can be set in the Settings dialog; @@@ is the command desired for execution.

A dynamic password may be generated by combining a user password and a time-dependent function, such that the communication is only valid for a short period. For example, if the user is using his or her own computer, a security code may be generated from that computer, included in the subject line or body of the email communication, in addition to or in place of the password. The basis for the security code is unique to the computer sending the email, and is generated by a utility from one or a combination of the processor serial number, hard drive serial number, MAC address, or unique hardware installed in the sending computer can be used. The code may be time-dependent and pseudorandom, and include a digital signature or hash of the message, so that interception of the email does not reveal sufficient information to compromise security. The hash, or digital signature, prevents an unauthorized user from changing the intended command. However, this technique is of limited value where the user seeks to employ hardware which is temporary or borrowed, and under these circumstances other methods for securing the communication as described herein are more suitable.

The security code for the computer that the user wants to send commands from is entered into a list or generated automatically during an authentication/enrollment protocol. When an email with a command is received, it will be only processed command if the security code matches a security code in the list. This insures the email is indeed coming from a computer that is authorized to send commands to the command execution parser.

The security of this method can be further enhanced by using the same utility that generates the security code on the computer sending the email. In this method, the security code, an encryption key and the time of day are used to generate a time-dependent code on the fly. The time-dependent security code indicates the time the email was sent. The user enters the security code and encryption key for each computer from which the system will accept commands, and indicates a time interval for commands to be valid. For example, if the user sets the system to scan the server every five minutes, the user might set the security time interval to 6 minutes. The user can then send an email with a command, and the system will see it within the valid time range. When sending an email with a command, the utility is used to generate the time-dependent code before sending the email, and this code is included in the email. When an email with a command is received, it will test the time-dependent code to determine its authenticity, i.e., to determine if the command was emailed from an allowed computer within the valid time range. This method results in a time-dependent code that is different each time an email is sent, thereby preventing someone from copying and reusing the time-dependent code, even within the permitted time. Under this method, the user can change the encryption key and the utility from time-to-time. To further enhance the security of this method, the algorithm and the utility to generate the security code and time-dependent code can be stored externally, and the algorithm itself can be changed from time-to-time. In this case, the algorithm must be changed on all relevant system simultaneously. In some embodiments, the system can be configured to use a different algorithm for each allowed computer.

The time-dependent code can also be used with the challenge/response system, particularly when the user is on a borrowed computer. This allows time to be used in filtering messages send from such borrowed computers, and makes it even more difficult to determine the password, or the algorithm used to manipulate the password in the event the communication or series of communication are intercepted.

One of the advantages of using a security code and time-dependent code as discussed above is that if an allowed computer is lost or stolen, the user needs only remove its security code from the list, and the lost, or stolen, computer can no longer process commands.

Another method to insure an email with a command was sent by the user is to utilize a list of trusted IP addresses 108. In this method, trusted IP addresses are entered into a list, and the email header of the email is scanned to determine if the email with the command was sent from a trusted IP address. The command is processed only if there is a match. Likewise, other information in the message header can be used for this purpose.

A rolling code authentication protocol can also be used to insure a email containing a command was actually sent by an authorized user, who may have an automatically generated or manual (printed) rolling code list. For example a security token, such as an RSA token or simple rolling code generator (e.g., LCD display, USB fob, etc.), may be used to generate a series of codes.

Interactive challenge-response authentication may also be implemented, for example a cryptographic protocol, personal/private information queries (e.g., mother's maiden name, etc.), or the like. In order to subvert man-in-the-middle attacks, known cryptographic schemes may be employed.

When using an interactive authentication method, the system can be configured to store commands in a queue, and send an authentication message when the number of commands in the queue reaches a predetermined number or when the user requests one. In this way, the user can send multiple commands and authenticate them all at once. This is especially useful where the protocol limits the communication of multiple commands in a single message.

Yet another method of security is to maintain either a white list of commands that are allowed to be processed, or a black list of commands that are not allowed to process, or both. This can be further segmented into levels of security or other rules relating to different commands or command classes.

If desired, the system can generate a reply to the sender of a command to indicate that the commands has been received and processed, and possibly a result of that command, if requested and/or appropriate.

Typical supported internal commands for execution by the command processor 128 are:
  Ping (produces a response to the sender's address, to verify system operation. A status message may also be included in the response)
  Shutdown (disables all or a portion of the system. Options include complete shutdown of the software, shutdown of filtering functions only, allowing other operations, such as remote commands, to continue operating, or shut down the computer on which the software executes)
  Startup (in the case where remote commands remain operable, commences email filtering functions)
  Commands to a specific program, for example Addfriend: friendName (Adds a new friend to the friends list in an anti-spam filter program)
  Run:externalCommand (This runs an external program on the computer. Generally, anything that can be typed on the command line of a DOS window can be entered here, including the name of a program with arguments, a URL, etc.). These commands can be filtered so that a hacker cannot execute malicious code on the user's computer.
  Send:filepathname (replies to you with an email message which includes a copy of the file you specified. That allows you to retrieve any file from the computer). Again, security is applied to these emails.
  Directory:path (replies with a directory listing for a desired path)
  DisableCommands (Tells system to stop accepting remote commands until someone physically reenables the host system command processor.)

If desired, multiple commands separated by a separator can be contained in one email.

The software may also respond to FTP and/or HTTP requests, and/or implement a local server using a standard or proprietary protocol.

As would be understood by those skilled in the art, the functions discussed herein can be performed on a client side, a server side or both. These functions could also be performed on any one or more computing devices, in a variety of combinations and configurations, and such variations are contemplated and within the scope of the present invention.

These examples are not meant to be limiting, but to demonstrate that there are various ways to secure remote commands. From these examples, methods for securing remote commands will become obvious to a person skilled in the art.

Additional aspects of the invention, together with the advantages and novel features appurtenant thereto, will become apparent to those skilled in the art upon examination of the foregoing. The objects and advantages of the invention may be realized and attained by means, instrumentalities and combinations particularly pointed out in the appended claims. The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

What is claimed is:

1. A remote command execution system, providing authentication, comprising:
  (a) an input channel configured to receive at least one electronic communication comprising an email from a user over a first information channel using a first channel communication interface;
  (b) a processor configured to:
    (i) generate a challenge communication using a second information channel distinct from the first information channel comprising a message containing a matrix of information, said matrix comprising a plurality of possible authentication codes comprising at least one valid authentication code and at least one invalid authentication code, wherein a valid authentication code is selected based on at least information not communicated within the same message, and using a second channel communication interface, wherein the first and second channel communication interfaces are different, selectively dependent on at least a portion of information of the at least one electronic communication;
    (ii) receive a selective response to the challenge communication through an authorized channel, containing authentication information communicated by a voice, dependent on a secret and information selectively derived from the challenge communication, wherein the secret is cryptographically protected against eavesdropping, the selective response being generated based on at least one pre-shared key, processed using a manually implemented algorithm by a user to produce an authentication response;

(iii) authenticate the user based on the authentication response, a digital signature, information contained in an email header of the received email, a time-dependent function of a time delay of the received email, an address of the authorized channel, and a password derived from an algorithm executed by the processor, communicated within an email communication to a remote location; and (iv) define a command from a portion of the electronic communication having a command information type; and (c) an output channel configured to pass the defined command to an automated command processor, for automatic execution.

2. The remote command execution system according to claim 1, wherein the electronic communication contains a request for authentication, the processor determining whether the electronic communication contains a request for authentication, and thereafter sending a request for authentication to a user.

3. The remote command execution system according to claim 1, wherein the processor executes an exception process if the electronic communication is intended for the system and is not a command or a request for authorization.

4. The remote command execution system according to claim 1, wherein the electronic communication comprises an email communication, and the processor is configured to process the email communication based on at least one of an inclusion list and an exclusion list.

5. The remote command execution system according to claim 1, wherein the processor is configured to impose a plurality of levels of authentication, a required level being determined based on at least one of an inclusion list and exclusion list.

6. The remote command execution system according to claim 5, wherein the at least one of an inclusion list and an exclusion list contains information used to identify a sender of an email communication.

7. The remote command execution system according to claim 1, wherein the command processor comprises an operating system of a computer.

8. The remote command execution system according to claim 1, wherein the command processor comprises application software executing under an operating system of a computer.

9. The remote command execution system according to claim 1, wherein the processor is further configured to execute the commands based on instructions received from the command processor.

10. The remote command execution system according to claim 1, wherein the authentication of the user is based on a cryptographic challenge-response algorithm in which the challenge communication comprises a challenge information, and the selective response comprises a secret transformation of the challenge information, wherein the processor is configured to verify the secret transformation represented in the selective response.

11. The remote command execution system according to claim 1, wherein the selective response is adapted to be generated based on at least one pre-shared key, processed using an automatically implemented algorithm by a user to produce a digital signature.

12. The remote command execution system according to claim 1, wherein the processor is configured to analyze email messages to determine if the command message has been altered from an authentic message content.

13. The remote command execution system according to claim 1, wherein the processor is configured to authenticate relying on a password communicated within an email communication.

14. The remote command execution system according to claim 1, wherein the processor is configured to authenticate relying on a password derived from an independent dynamic source, communicated within the electronic communication.

15. The remote command execution system according to claim 1, wherein the processor is configured to authenticate in a manner dependent on a password derived from an algorithm executed by the processor, communicated within an email communication to a remote location.

16. The remote command execution system according to claim 15, wherein the email communication to the remote location is a secure communication.

17. The remote command execution system according to claim 15, wherein the algorithm dynamically produces passwords.

18. The remote command execution system according to claim 1, wherein the authenticity of the electronic communication is determined based on a shared secret which is not explicitly communicated in the electronic communication.

19. The remote command execution system according to claim 1, wherein the authentication relies on a bidirectional series of at least two emails.

20. The remote command execution system according to claim 1, wherein the authentication relies on a bidirectional series of at least one voice communication through a telephony network.

21. The remote command execution system according to claim 1, wherein the authentication persists over a series of electronic communications which themselves are not fully authenticated.

22. The remote command execution system according to claim 1, wherein the authentication relies on a shared secret which is not itself communicated through the electronic communication.

23. The remote command execution system according to claim 1, wherein the command processor is independent from the electronic communication analyzing process.

24. The remote command execution system according to claim 1, wherein the processor is configured to communicate with an email server.

25. The remote command execution system according to claim 1, wherein the processor filters email.

26. The remote command execution system according to claim 1, wherein the processor is configured to authenticate the electronic communication on a response to a request for at least private personal information.

27. The remote command execution system according to claim 1, wherein the processor is configured to communicate with a network interface within an appliance.

28. The remote command execution system according to claim 1, wherein the processor is configured to send an acknowledgment when a command has been processed.

29. The remote command execution system according to claim 1, wherein the processor is configured to respond to at least one of File Transfer Protocol requests and Hypertext Transport Protocol requests, and implements a local server.

30. A method for remotely executing authenticated commands, comprising the steps of:

(a) receiving at least one electronic communication comprising an email over a first information channel using a first channel communication interface;

(b) generating a challenge communication using a second information channel distinct from the first information channel comprising a message containing a matrix of information, said matrix comprising a plurality of possible authentication codes comprising at least one valid authentication code and at least one invalid authentication code, wherein a valid authentication code is selected based on at least information not communicated within the same message, and using a second channel communication interface, wherein the first and second communication interfaces are different, selectively dependent on at least a portion of information of the at least one electronic communication;

(c) receiving a selective response to the challenge communication through an authorized channel, containing authentication information communicated by voice, dependent on a secret and information selectively derived from the challenge communication, wherein the secret is cryptographically protected against eavesdropping, the selective response being generated based on at least one pre-shared key, processed using a manually implemented algorithm by a user to produce an authentication response;

(d) authenticating the user based on the authentication response, a digital signature, information contained in an email header of the received email, a time-dependent function of a time delay of the received email, an address of the authorized channel, and a password derived from an algorithm executed by the processor, communicated within an email communication to a remote location;

(e) defining a command from a portion of the electronic communication having a command information type; and (f) outputting the defined command through an output channel to an automated command processor, for automated execution.

31. The method according to claim 30, wherein the authenticity is determined based on at least one pre-shared key, processed using a manually implemented algorithm by a user to produce an authentication response.

32. The method according to claim 30, wherein the authenticity is determined based on at least one pre-shared key, processed using an automatically implemented algorithm by a user to produce a digital signature.

33. The method according to claim 30, wherein the authenticity is determined based on a cryptographic hash.

34. The method according to claim 30, wherein further comprising of analyzing email communications to determine if the command message has been altered from an authentic message content.

35. The method according to claim 30, wherein the authentication relies on a password derived from an independent dynamic source, communicated within an electronic communication, further comprising the step of accessing the independent dynamic source to authenticate the electronic communication after receipt.

36. The method according to claim 30, further comprising conducting a bidirectional series of communications comprising communicating at least two emails.

37. The method according to claim 30, further comprising conducting a bidirectional communication through a voice telephony channel.

38. The method according to claim 30, wherein the authentication persists over a series of electronic communications, each of which is not fully authenticated.

39. The method according to claim 30, wherein authenticating the user based on the selective response does not require that the secret be known to both a sender and a recipient seeking to authenticate the sender.

40. The method according to claim 30, wherein the command processor operates independently of the electronic communication analyzing process.

41. The method according to claim 30, wherein the electronic communication comprises an email communication which contains a request for authentication, further comprising determining whether the email communication contains a request for authentication, and thereafter sending a request for authentication to a user.

42. The method according to claim 30, further comprising executing an exception process if the electronic communication is not a command or request for authorization.

43. The method according to claim 30, wherein the electronic communication is selectively processed based on at least one of an inclusion list and an exclusion list.

44. The method according to claim 30, wherein a plurality of levels of authentication are provided, further comprising selecting a level based on at least one of an inclusion list and exclusion list.

45. The method according to claim 44, wherein the at least one of an inclusion list and exclusion list contains information used to identify a sender of an email.

46. The remote command execution system according to claim 30, wherein the command processor comprises an operating system of a computer.

47. The method according to claim 30, wherein the command processor comprises application software executing under an operating system of a computer.

48. The method according to claim 30, further comprising determining an authenticity based on a password derived from an algorithm, communicated within an email communication from a location proximate to the command processor to a remote location.

49. The method according to claim 48, wherein the email communication to the remote location is a secure communication.

50. The method according to claim 48, wherein the algorithm dynamically produces passwords.

51. The method according to claim 30, wherein the authenticity of the electronic communication is determined based on a shared secret which is not explicitly communicated during authentication.

52. The method according to claim 30, further comprising filtering received email to determine whether the filtered email contains a command or authentication information.

53. The method according to claim 52, further comprising analyzing the received email communication for time delay.

54. The method according to claim 52, further comprising analyzing a header of the received email communication header for authentication thereof.

55. The method according to claim 30, further comprising authenticating the electronic communication based on at least a time-dependent function.

56. The method according to claim 30, wherein further comprising authenticating the electronic communication based on a response to a request for at least private personal information.

57. The method according to claim 30, wherein the defined command comprises a request to respond to at least one of File Transfer Protocol requests and Hypertext Transport Protocol requests.

58. The method according to claim 30, wherein the authenticity is determined based on a cryptographic challenge-response algorithm.

59. A method for remotely executing authenticated commands, comprising the steps of:
- (a) receiving at least one electronic communication comprising an email through a first information communication channel comprising the Internet;
- (b) selectively extracting information portions having at least one information type from the electronic communication;
- (c) analyzing the extracted information to determine whether it meets predetermined criteria;
- (d) communicating a challenge communication through a second information communication channel distinct from the first information communication channel comprising a message containing a matrix of information, said matrix comprising a plurality of possible authentication codes comprising at least one valid authentication code and at least one invalid authentication code, wherein a valid authentication code is selected based on at least information not communicated within the same message, the challenge communication being defined selectively in dependence on at least a portion of the information contained in the at least one electronic communication;
- (e) receiving a selective response to the challenge communication communicated by a voice through an authorized channel having a channel address identification dependent on a secret and information selectively derived from the challenge communication, wherein the secret is cryptographically protected against eavesdropping, the selective response being generated based on at least one pre-shared key, processed using a manually implemented algorithm by a user to produce an authentication response;
- (f) authenticating the user based on the extracted information, the authentication response, a digital signature, information contained in an email header of the received email, a time-dependent function of a time delay of the received email, the channel address identification, and a password derived from an algorithm executed by the processor, communicated within an email communication to a remote location;
- (g) defining a command from at least a portion of the electronic communication having a command information type; and
- (h) presenting the command through an output channel to an automated command processor for execution.

\* \* \* \* \*